(12) United States Patent
Nwachukwu et al.

(10) Patent No.: US 10,252,210 B2
(45) Date of Patent: Apr. 9, 2019

(54) METHODS FOR REDUCING PARTICULATES IN THE AIR

(75) Inventors: Chisomaga Ugochi Nwachukwu, Cincinnati, OH (US); Alan Edward Sherry, Newport, KY (US)

(73) Assignee: The Procter & Gamble Company, Cincinnati, OH (US)

( * ) Notice: Subject to any disclaimer, the term of this patent is extended or adjusted under 35 U.S.C. 154(b) by 715 days.

(21) Appl. No.: 13/104,396

(22) Filed: May 10, 2011

(65) Prior Publication Data

US 2012/0288467 A1   Nov. 15, 2012

(51) Int. Cl.
*B03C 3/00* (2006.01)
*B01D 49/00* (2006.01)
*C09K 3/22* (2006.01)

(52) U.S. Cl.
CPC .............. *B01D 49/003* (2013.01); *C09K 3/22* (2013.01)

(58) Field of Classification Search
None
See application file for complete search history.

(56) References Cited

U.S. PATENT DOCUMENTS

| | | | |
|---|---|---|---|
| 3,766,156 A | 10/1973 | Kine et al. | |
| 4,246,292 A | 1/1981 | Konst et al. | |
| 4,439,343 A * | 3/1984 | Albanese | 516/6 |
| 4,495,367 A | 1/1985 | Dammann | |
| 4,756,347 A | 7/1988 | Hagan et al. | |
| 5,108,660 A | 4/1992 | Michael | |
| 5,215,784 A * | 6/1993 | Tippett et al. | 427/221 |
| 5,714,137 A | 2/1998 | Trinh | |
| 5,891,392 A | 4/1999 | Montcello et al. | |
| 5,948,742 A * | 9/1999 | Chang et al. | 510/191 |
| 6,117,440 A | 9/2000 | Suh et al. | |
| 6,569,261 B1 | 5/2003 | Aubay et al. | |
| 8,440,171 B2 * | 5/2013 | Valpey et al. | 424/45 |
| 2003/0168642 A1 * | 9/2003 | Shannon | C09D 5/00 252/500 |
| 2003/0224030 A1 | 12/2003 | Uchiyama et al. | |
| 2006/0198896 A1 | 9/2006 | Liversidge et al. | |
| 2006/0217286 A1 | 9/2006 | Geoffroy et al. | |
| 2007/0110699 A1 * | 5/2007 | Sherry | 424/70.17 |
| 2007/0135561 A1 | 6/2007 | Rath et al. | |
| 2009/0270304 A1 | 10/2009 | Cermenati et al. | |
| 2012/0168971 A1 | 7/2012 | Hansen et al. | |

FOREIGN PATENT DOCUMENTS

| | | |
|---|---|---|
| JP | 61-007828 | 6/1978 |
| JP | 2775162 | 11/1988 |
| JP | 06-057238 | 8/1994 |
| JP | A-H07-150193 | 6/1995 |
| JP | A-H08-024320 | 1/1996 |
| JP | A-2004-313893 | 11/2004 |
| JP | 2008 248225 A | 10/2008 |
| JP | 2013-233542 | 11/2013 |
| WO | WO 9728883 A1 | 8/1997 |
| WO | WO 0228179 A1 | 4/2004 |
| WO | WO 2007/002044 A1 | 1/2007 |

OTHER PUBLICATIONS

International Search Report, dated Oct. 5, 2012, containing 67 pages.
U.S. Appl. No. 13/104,436, filed May 10, 2011, Nwachukwu, et al.
U.S. Appl. No. 13/104,329, filed May 10, 2011, Nwachukwu, et al.

\* cited by examiner

*Primary Examiner* — Mina Haghighatian
*Assistant Examiner* — Luke E Karpinski
(74) *Attorney, Agent, or Firm* — Abbey A. Lopez

(57) ABSTRACT

Methods for reducing particulates in the air are disclosed. In some embodiments, the method comprises spraying a composition having an effective amount of a zwitterionic polymer, a compressed gas propellant, and an aqueous carrier in to the air. The composition agglomerates particulates upon contacting particulates in the air thereby reducing particulates in the air.

11 Claims, 1 Drawing Sheet

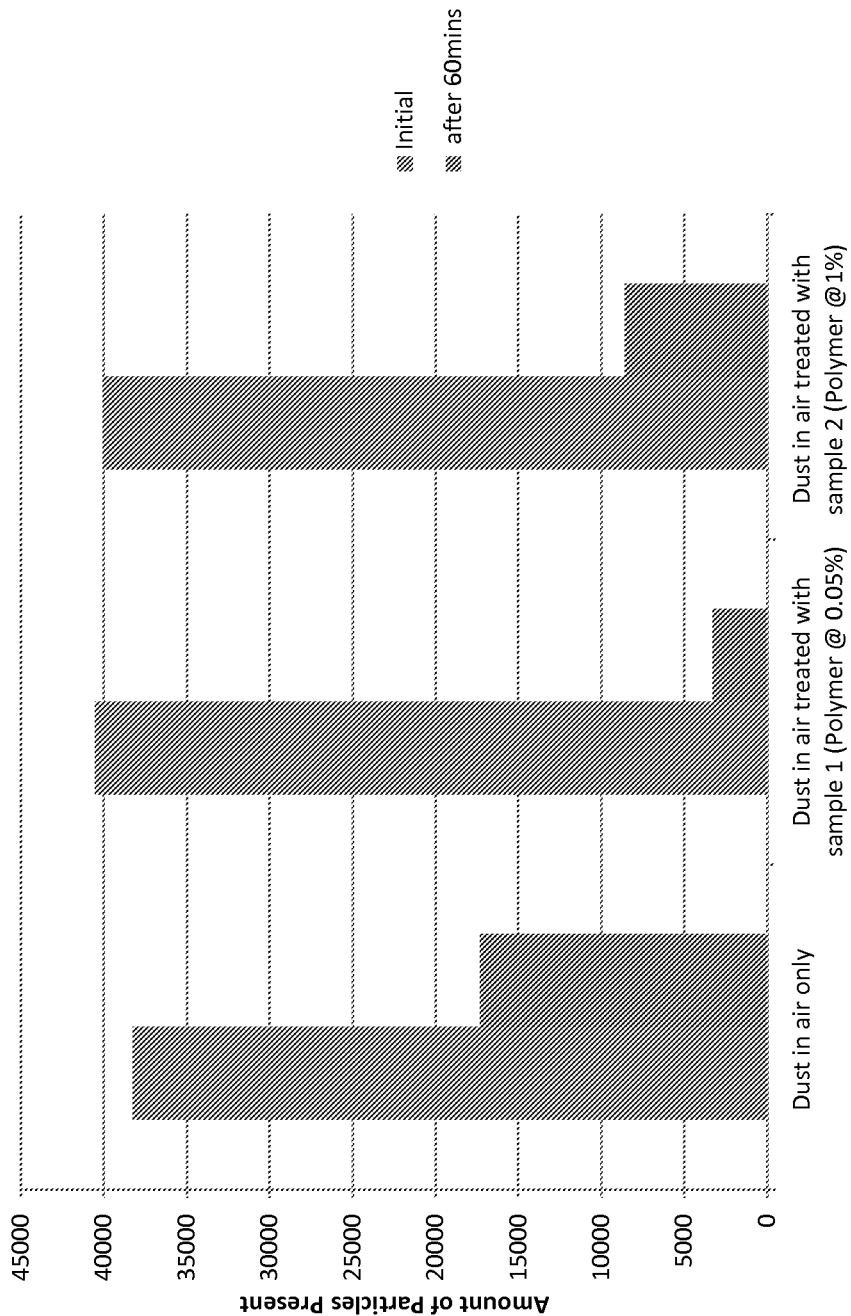

METHODS FOR REDUCING PARTICULATES IN THE AIR

FIELD OF THE INVENTION

The present invention relates to methods for reducing particulates in the air.

BACKGROUND OF THE INVENTION

Particulates are believed to have a significant effect on air quality and on the health of individuals, especially those susceptible to allergies. Particulates include household pollutants, dust particles, silica, lint, particulates containing allergens such as pet dander and dust mites. Particulates in the air are generally about 0.1 ums to 50 ums in size.

Products for reducing particulates are well known and described in the patent literature. Many products use filtration and/or ionization technology to reduce particulates in the air. Such technologies can be costly or cumbersome to use over sprayable products for controlling particulates. Such sprayable products are described in the patent literature and typically include ingredients that help precipitate particulates from the air or provide a barrier that covers particulates that land on surfaces. However, these sprayable products may be perceived as ineffective in removing particulates.

For example, a precipitating ingredient may mechanically force particulates to a surface but the smaller, lighter particulates that were precipitated can quickly re-circulate up into the air upon movement of air. Where a product includes dust controlling levels of a barrier forming ingredient, a sticky residue often times results on the surface. In some instances, this sticky residue can attract more dust.

For these reasons, there continues to exist a need for improved methods for reducing particulates in the air without leaving a sticky residue.

SUMMARY OF THE INVENTION

The present invention relates to methods for reducing particulates in the air by providing a composition comprising an effective amount of a zwitterionic polymer, a compressed gas propellant, and an aqueous carrier, wherein the polymer agglomerates particulates in the air and thereby reduces particulates in the air.

In some embodiments, the method may comprise providing a composition having a perfume mixture and/or a malodor counteractant.

BRIEF DESCRIPTION OF THE DRAWINGS

While the specification concludes with claims particularly pointing out and distinctly claiming the invention, it is believed that the present invention will be better understood from the following description taken in conjunction with the accompanying drawings in which:

FIG. 1 is a graph showing the dust reduction profile of a composition with low amounts of zwitterionic polymer, according to the present invention, as compared with a composition having higher levels of zwitterionic polymer.

DETAILED DESCRIPTION OF THE INVENTION

The present invention relates to methods for reducing particulates from the air by spraying a composition having an effective amount of a zwitterionic polymer, a compressed gas propellant, and an aqueous carrier into the air.

By "aqueous composition" it is meant herein water and solvents that have a 5% or more water solubility on a weight basis. Non-limiting examples of aqueous carriers include deionized water, distilled water, city water, ethanol, 2-propanol, glycerine and propylene glycol n-butyl ether.

By "molecular mass" it is meant herein the weight-average molecular mass, expressed in g/mol. The latter can be determined by aqueous gel permeation chromatography ("GPC") or measurement of the intrinsic viscosity in a 1N $NaNO_3$ solution at 30° C.

By "sulphobetaine group" it is meant herein a group comprising an anionic group and a cationic group, with at least one of the groups containing a sulphur atom.

In certain embodiments, the composition comprises a perfume that delivers a consistent perfume release profile. A "consistent perfume release profile" is defined as a perceivable perfume intensity which is delivered initially and a comparable intensity is maintained for at least 10 minutes or longer (e.g., 30 minutes, or more).

In other embodiments, the composition may also deliver a genuine malodor removal benefit without impacting the character of the parent fragrance (i.e. the perfume mixture without any malodor counteractants). A "genuine malodor removal benefit" is defined as an analytically measurable malodor reduction. Thus, if the composition delivers a genuine malodor removal benefit, the composition will not function merely by using perfume to cover up or mask odors.

In some embodiments, the composition may be fabric-safe so that it does not stain fabrics with which it comes into contact.

The composition herein has a viscosity of about 0.1 cps to about 8 cps, alternatively from about 1 to about 6 cps, alternatively about 1 to about 4 cps, alternatively about 2.5 to about 4 cps, alternatively about 3.5 cps when measured with a Brookfield Synchro-Lectric Viscometer (Model LVF) at 21° C. with spindle 1 (60 RPM).

The pH of the composition herein may be from about 1 to about 10, alternatively from about 1 to about 8, alternatively from about 3 to about 8, alternatively from about 4 to about 8, alternatively from about 4 to about 7. Accordingly, the composition herein may further comprise an acid or base to adjust pH as appropriate.

A suitable acid for use herein is an organic and/or an inorganic acid. A preferred organic acid for use herein has a pKa of less than about 6. A suitable organic acid is selected from the group consisting of citric acid, lactic acid, glycolic acid, succinic acid, maleic acid, benzoic acid, glutaric acid and adipic acid and a mixture thereof. A suitable inorganic acid is selected from the group consisting hydrochloric acid, sulphuric acid, phosphoric acid and a mixture thereof.

A typical level of such an acid, when present, is from about 0.01% to about 5.0%, alternatively from about 0.01% to about 3.0%, alternatively from about 0.01% to about 1.5% alternatively about 0.1%, by weight of the composition.

There are numerous embodiments of the methods described herein, all of which are intended to be non-limiting examples.

Water-Soluble or Water-Dispersible Zwitterionic Polymer

The method of the present invention comprises spraying a composition comprising a water-soluble or water-dispersible agglomerating zwitterionic polymer into the air. The polymer is present at a level of from about 0.001% to about 1%, alternatively from about 0.001% to about 0.5%, alternatively from about 0.001% to about 0.2%, alternatively from about 0.001% to about 0.1%, alternatively from about 0.001% to about 0.05%, alternatively about 0.001% to about 0.2%, alternatively about 0.01% to about 0.1%, alternatively about 0.01% to about 0.05%, by weight of the composition.

The zwitterionic polymer of the present invention comprises, in the form of polymerized units:

(a) at least a monomer compound of general formula I:

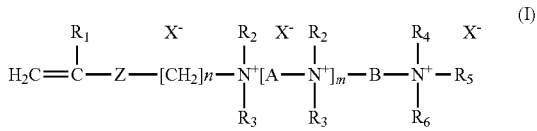

(I)

in which $R_1$ is a hydrogen atom, a methyl or ethyl group;

$R_2$, $R_3$, $R_4$, $R_5$ and $R_6$, which are identical or different, are linear or branched $C_1$-$C_6$, alkyl, hydroxyalkyl or aminoalkyl groups;

m is an integer from 0 to 10;

n is an integer from 1 to 6;

Z represents a —C(O)O— or —C(O)NH— group or an oxygen atom;

A represents a $(CH_2)_p$ group, p being an integer from 1 to 6;

B represents a linear or branched $C_2$-$C_{12}$, polymethylene chain optionally interrupted by one or more heteroatoms or heterogroups, and optionally substituted by one or more hydroxyl or amino groups;

X, which are identical or different, represent counterions; and (b) at least one hydrophilic monomer carrying a functional acidic group which is copolymerizable with (a) and which is capable of being ionized in the application medium;

(c) optionally at least one monomer compound with ethylenic unsaturation with a neutral charge which is copolymerizable with (a) and (b), alternatively a hydrophilic monomer compound with ethylenic unsaturation with a neutral charge, carrying one or more hydrophilic groups, which is copolymerizable with (a) and (b).

The monomer (a) can be prepared, for example, according to the reaction schemes shown in U.S. Pat. No. 6,569,261 to Rhodia, column 2, line 40 to column 3, line 45 which is incorporated herein by reference. The resulting polymer I has a molecular mass of at least 1000, alternatively at least 10,000; alternatively up to 20,000,000, alternatively up to 10,000,000. The polymer is alternatively a random polymer.

Alternatively, in the general formula I of the monomer (a), Z represents C(O)O, C(O)NH or O, alternatively C(O)NH; n is equal to 2 or 3, very particularly 3; m ranges from 0 to 2 and is alternatively equal to 0 or 1, very particularly to 0; B represents —CH2—CH(OH)—(CH2)$_q$, with q from 1 to 4, alternatively equal to 1; $R_1$ to $R_6$, which are identical or different, represent a methyl or ethyl group.

A suitable monomer (a) is a diquat of following formula:

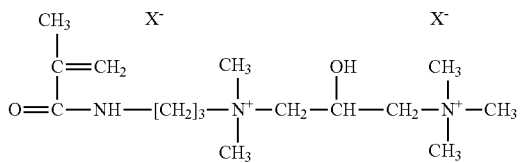

in which X⁻ representing the chloride ion.

Other suitable monomers (a) are:

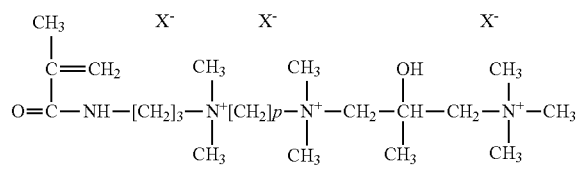

wherein p=2 to 4.

The X anions are in particular a halogen, alternatively chlorine, sulfonate, sulfate, hydrogensulfate, phosphate, phosphonate, citrate, formate and acetate anion.

The monomers (b) may be $C_3$-$C_8$ carboxylic, sulfonic, sulfuric, phosphonic or phosphoric acids with monoethylenic unsaturation, their anhydrides and their salts which are soluble in water and mixture thereof. Suitable monomers (b) are acrylic acid, methacrylic acid, α-ethacrylic acid, β,β-dimethylacrylic acid, methylenemalonic acid, vinylacetic acid, allylacetic acid, ethylidineacetic acid, propylidineacetic acid, crotonic acid, maleic acid, fumaric acid, itaconic acid, citraconic acid, mesaconic acid, N-(methacroyl)alanine, N-(acryloyl)hydroxyglycine, sulfopropyl acrylate, sulfoethyl acrylate, sulfoethyl methacrylate, styrenesulfonic acid, vinylsulfonic acid, vinylphosphonic acid, phosphoethyl acrylate, phosphonoethyl acrylate, phosphopropyl acrylate, phosphonopropyl acrylate, phosphoethyl methacrylate, phosphonoethyl methacrylate, phosphopropyl methacrylate, phosphonopropyl methacrylate, and the alkali metal and ammonium salts thereof, and mixtures thereof.

Optional monomers (c) include acrylamide, vinyl alcohol, $C_1$-$C_4$ alkyl esters of acrylic acid and of methacrylic acid, $C_1$-$C_4$ hydroxyalkyl esters of acrylic acid and of methacrylic acid, in particular, ethylene glycol and propylene glycol acrylate and methacrylate, polyalkoxylated esters of acrylic acid and of methacrylic acid, in particular, the polyethylene glycol and polypropylene glycol esters, esters of acrylic acid or of methacrylic acid and of polyethylene glycol or polypropylene glycol $C_1$-$C_{25}$ monoalkyl ethers, vinyl acetate, vinylpyrrolidone or methyl vinyl ether, and mixtures thereof.

The level of monomers (a) is between 3 and 80 mol %, alternatively 10 to 70 mol %. The level of monomers (b) is between 10 and 95 mol %, alternatively 20 to 80 mol %. The level of monomers (c) is between 0 and 50%, alternatively 0 and 30%. The molar ratio of cationic monomer to the anionic monomer (a)/(b) is between 80/20 and 5/95, alternatively between 60/40 and 20/80.

The polymers of the invention can be obtained according to known techniques for the preparation of polymers. One polymer is the following:

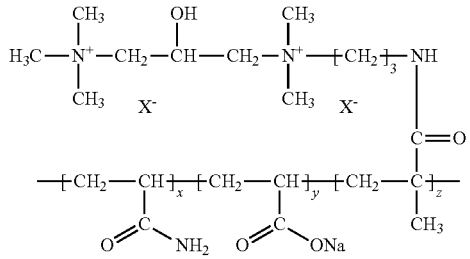

with x having a mean value of 0 to 50 mol %, alternatively of 0 to 30 mol %, y having a mean value of 10 to 95 mol %, alternatively of 20 to 80 mol %, z having a mean value of 3 to 80 mol %, alternatively of 10 to 70 mol % and the y/z ratio being of the order of 4/1 to 1/2, with x+y+z=100%, x, y and z representing the mol % of units derived from acrylamide, acrylic acid (sodium salt) and from Diquat respectively.

Other polymer chemical structures are as follows:

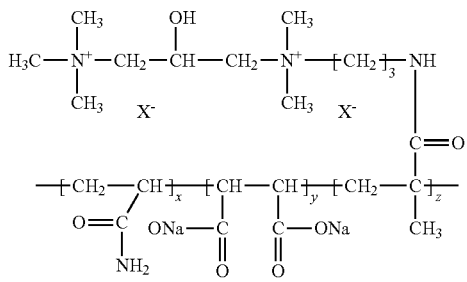

with x having a mean value of 0 to 50 mol %, alternatively of 0 to 30 mol %, y having a mean value of 10 to 95 mol %, alternatively of 20 to 80 mol %. z having a mean value of 3 to 80 mol %, alternatively of 10 to 70 mol % and the y:z ratio being of the order of 4:1 to 1:2;

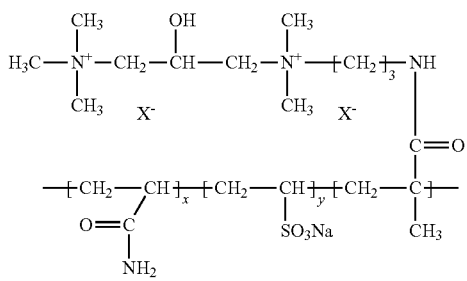

wherein x has a mean value of 0 to 50 mol %, alternatively of 0 to 30 mol %, y has a mean value of 10 to 95 mol %, alternatively of 20 to 80 mol %; z has a mean value of 3 to 80 mol %, alternatively of 10 to 70 mol %, and the y:z ratio being of the order of 4:1 to 1:2;

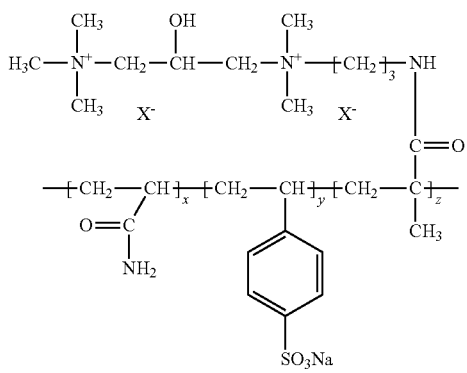

with x has a mean value of 0 to 50%, alternatively of 0 to 30 mol %, y has a mean value of 10 to 95 mol %, alternatively of 20 to 80 mol %, z has a mean value of 3 to 80 mol %, alternatively of 10 to 70 mol %, and the y:z ratio alternatively being of the order of 4:1 to 1:2;

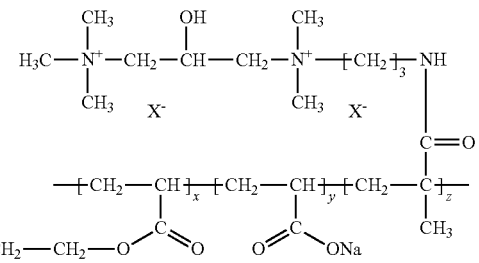

wherein x having a mean value of 0 to 50 mol %, alternatively of 0 to 30 mol %, y has a mean value of 10 to 95 mol %, alternatively of 20 to 80 mol %, z has a mean value of 3 to 80 mol %, alternatively of 10 to 70 mol %, and the y:z ratio being of the order of 4:1 to 1:2;

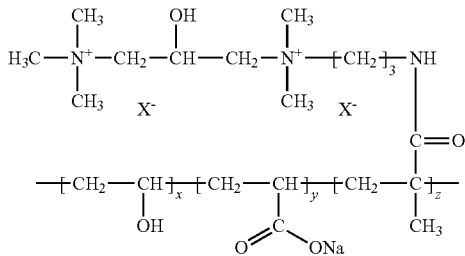

wherein x has a mean value of 0 to 50 mol %, alternatively of 0 to 30 mol %, y has a mean value of 10 to 95 mol %, alternatively of 20 to 80 mol %, z has a mean value of 3 to 80 mol %, alternatively of 10 to 70 mol %, and the y:z ratio being of the order of 4:1 to 1:2; or

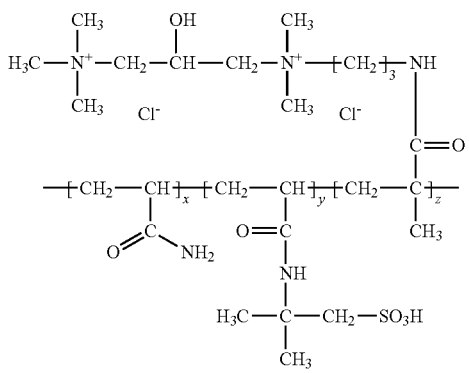

wherein x has a mean value of 0 to 50 mol %, alternatively of 0 to 30 mol %, y has a mean value of 10 to 95 mol %, alternatively of 20 to 80 mol %, z has a mean value of 3 to 80 mol %, alternatively of 10 to 70 mol %, and the y:z ratio being of the order of 4:1 to 1:2.

Suitable polymers are available from Rhodia.

Polybetaine Polymer

A suitable zwitterionic polymer of the present invention may be a polybetaine polymer. The polybetaine polymer may comprises a zwitterionic unit A or a mixture thereof, wherein unit A comprises a betaine group or a mixture thereof characterized by the betaine group of the unit A being a sulphobetaine group or a mixture thereof.

In one embodiment, the polybetaine polymer is a homopolymer.

In another embodiment, the polybetaine polymer is a copolymer, alternatively a statistical copolymer. In some embodiments, the polybetaine copolymer comprises a mixture of units A. In yet another embodiment herein, the polybetaine copolymer comprises unit A or mixtures thereof and the following:
- a unit B being at least one hydrophilic monomer carrying a functional acidic group which is copolymerizable with unit A and which is capable of being ionized in the application medium; and
- optionally, a unit C being at least one monomer compound with ethylenic unsaturation with a neutral charge which is copolymerizable with units A and B, alternatively a hydrophilic monomer compound with ethylenic unsaturation with a neutral charge, carrying one or more hydrophilic groups, which is copolymerizable with units A and B.

In embodiments where the polybetaine polymer is a copolymer comprising units other than units A, the units A, B, as well as possibly with other optional units, form a polyalkylene hydrocarbon chain possibly broken by one or more nitrogen or sulphur atoms.

a. Units A Containing a Sulphobetaine Group

The betaine group of the units A contains an anionic group and a cationic group, with at least one of the groups containing a sulphur atom. The anionic group may be a carbonate group, a sulphuric group such as a sulphonate group, a phosphorus group such as a phosphate, phosphonate, phosphinate group, or an ethanolate group. The cationic group may be an onium or inium group from the nitrogen, phosphate or sulphur family, for example, an ammonium, pyridinium, imidazolinium, phosphonium or sulphonium group. In one embodiment, the betaine group is a sulphobetaine group containing a sulphonate group and a quaternary ammonium group. The present invention encompasses copolymers containing different betaine groups as units A in the copolymer.

The betaine groups are typically the pendant groups of the polybetaine polymer herein, typically obtained from monomers containing at least one ethylene non-saturation.

At the core of the units A, the number of positive charges is equal to the number of negative charges. The units A are electrically neutral, in at least one pH range.

Useful betaine groups may be represented, in case of cations from the nitrogen family, by the following formulae (i) to (iv), having a cationic charge at the centre of the function and an anionic charge at the end of the function:

$$-N^{(+)}(R^1)(R^2)-R-A-O^{(-)} \quad (i)$$

$$-(R^3)C=N^{(+)}(R^4)-R-A-O^{(-)} \quad (ii)$$

$$-(R^3)(R)C-N^{(+)}(R^4)(R^5)-R-A-O^{(-)} \quad (iii)$$

$$-N^{(+)}(=R^6)-R-A-O^{(-)} \quad (iv)$$

wherein:
$R^1$, $R^2$ and $R^5$, are similar or different, and represent an alkyl radical containing 1 to 7 carbon atoms, alternatively 1 to 2.
$R^3$ et $R^4$, are similar or different, and represent hydrocarbon radicals forming, with the nitrogen atom, a nitrogen heterocycle comprising possibly one or more other heteroatoms, preferably nitrogen $R^6$ represents a hydrocarbon radical forming, with the nitrogen atom, a saturated or unsaturated nitrogen heterocycle, comprising possibly one or more other heteroatoms, alternatively nitrogen.
R represents a linear or branched alkylene radical comprising 1 to 15 carbon atoms, preferably 2 to 4, possibly substituted by one or more hydroxy groups, or a benzylene radical,
A represents S(=O)(=O).

Useful betaine groups may be represented, in case of cations from the phosphorus family, are represented by formula (v):

$$-P^{(+)}(R^1)(R^2)-R-A-O^{(-)} \quad (v)$$

wherein $R^1$, $R^2$, R and A have the definition stated above.

Useful betaine groups may be represented, in case of cations from the sulphur family, are represented by formulae (vi) and (vii):

$$-S^{(+)}(R^1)-R-A-O^{(-)} \quad (vi)$$

$$-R-A'(-O^{(-)})-R-S^{(+)}(R^1)(R^2) \quad (vii)$$

wherein for formula (vi):
$R^1$ and R have the definition stated above,
A represents S(=O)(=O), OP(=O)(=O), OP(=O)(OR'), P(=O)(OR') or P(=O)(R'),
R represents an alkyl radical containing 1 to 7 carbon atoms or a phenyl radical
or wherein for formula (vii):
$R^1$, $R^2$ and R have the definition stated above, and
A' represents —O—P(=O)—O—.

The betaine groups may be connected to the carbon atoms of a macromolecular chain derived from the polymerisation of an ethylene non-saturation (dorsal, skeleton) of the polymer by the intermediary, namely of a bivalent or polyvalent hydrocarbon pattern (for example, alkylene or arylene), possibly broken by one or several heteroatoms, namely of oxygen or nitrogen, an ester pattern, an amide pattern, or even by a valency link.

The polybetaine polymer herein may be obtained by radical polymerisation: of monomers A comprising an ethylenically unsaturated betaine group, namely of ethylenically unsaturated monomers containing at least one betaine group with the above formulae, and optionally monomers B and C.

Said monomers A are for example:
- one or more mono- or poly-ethylenically unsaturated hydrocarbon radicals (namely vinyl, allyl, styrenyl, and the like),
- one or more mono- or poly-ethylenically unsaturated ester radicals (namely acrylate, methacrylate, maleate, and the like) and/or
- one or more mono- or poly-ethylenically unsaturated amide radicals (namely acrylamido, methacrylamido, and the like)

The units A may derive from at least one betaine monomer A selected from group consisting of the following monomers:
alkylsulphonates of dialkylammonium alkyl acrylates or methacrylates, acrylamido or methacrylamido, such as:
sulphopropyl dimethyl ammonium ethyl methacrylate, marketed by RASCHIG under the name SPE:

sulphoethyl dimethyl ammonium ethyl methacrylate and sulphobutyl dimethyl ammonium ethyl methacrylate:

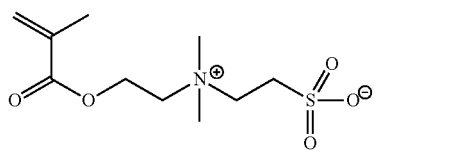

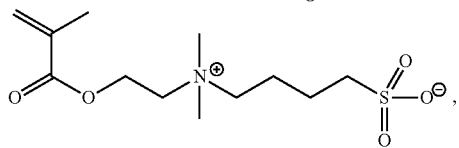

whose synthesis is described in the article "Sulfobetaine Zwitterionomers based on n-butyl acrylate and 2-Ethoxyethyl acrylate: monomer synthesis and copolymerization behaviour", Journal of Polymer Science 40, 511-523 (2002);

sulfohydroxypropyl dimethyl ammonium ethyl methacrylate:

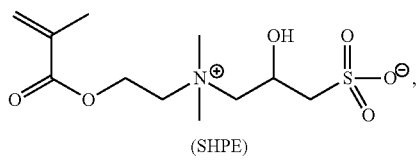 [SMILES: C=C(C)C(=O)OCC[N+](C)(C)CC(O)CS(=O)(=O)[O-]]

(SHPE)

sulphopropyl dimethylammonium propyl acrylamide:

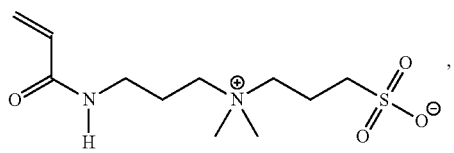 [SMILES: C=CC(=O)NCCC[N+](C)(C)CCCS(=O)(=O)[O-]]

whose synthesis is described in the article "Synthesis and solubility of the poly(sulfobetaine)s and the corresponding cationic polymers: 1. Synthesis and characterization of sulphobetaines and the corresponding cationic monomers by nuclear magnetic resonance spectra", Wen-Fu Lee and Chan-Chang Tsai, Polymer, 35 (10), 2210-2217 (1994), sulphopropyl dimethylammonium propyl methacrylamide, marketed by RASCHIG under the name SPP:

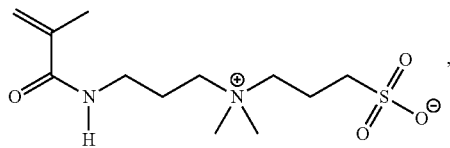

(SPP)

sulphopropyl dimethylammonium ethyl methacrylate, marketed by RASCHIG under the name SPDA:

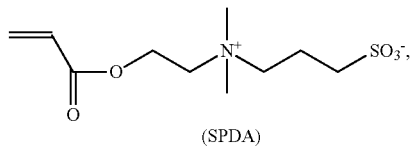

(SPDA)

sulphohydroxypropyl dimethyl ammonium propyl methacrylamido:

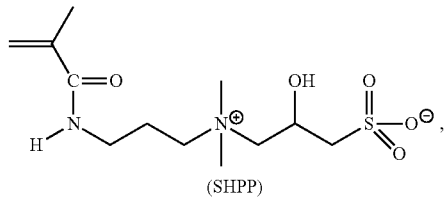

(SHPP)

sulphopropyl diethyl ammonium ethyl methacrylate:

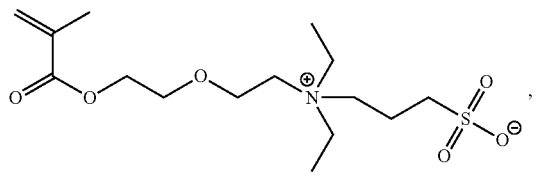 [SMILES: C=C(C)C(=O)OCCOCC[N+](CC)(CC)CCCS(=O)(=O)[O-]]

whose synthesis is described in the article "Poly(sulphopropylbetaines): 1. Synthesis and characterization", V. M. Monroy Soto and J. C. Galin, Polymer, 1984, Vol 25, 121-128, sulphohydroxypropyl diethyl ammonium ethyl methacrylate:

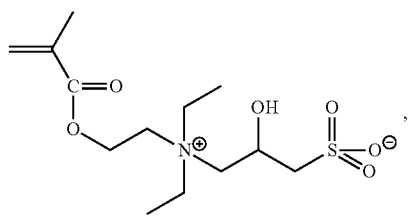 [SMILES: C=C(C)C(=O)OCC[N+](CC)(CC)CC(O)CS(=O)(=O)[O-]]

heterocyclic betaine monomers, such as:
sulphobetaines derived from piperazine:

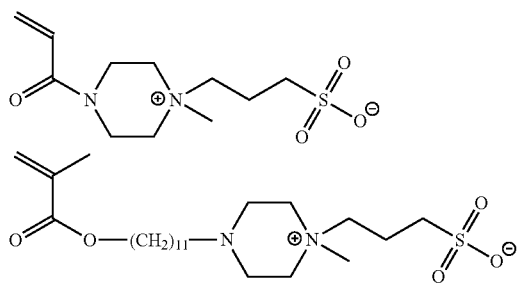

-continued

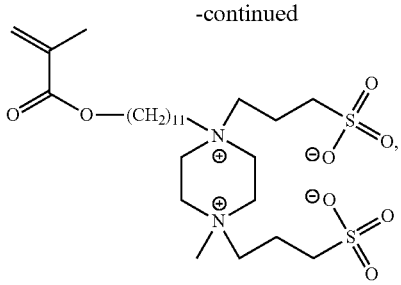

whose synthesis is described in the article "Hydrophobically Modified Zwitterionic Polymers Synthesis, Bulk Properties, and Miscibility with Inorganic Salts", P. Koberle and A. Laschewsky, Macromolecules 27, 2165-2173 (1994), sulphobetaines derived from 2-vinylpyridine and 4-vinylpyridine, such as:
the 2-vinyl (3-sulphopropyl)pyridinium betaine (2SPV or "SPV"), marketed by RASCHIG under the name SPV,

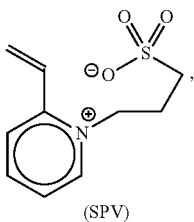

(SPV)

the 4-vinyl (3-sulphopropyl)pyridinium betaine (4SPV) whose synthesis is described in the article "Evidence of ionic aggregates in some ampholytic polymers by transmission electron microscopy", V. M. Castaõ and A. E. González, J. Cardoso, O. Manero and V. M. Monroy, J. Mater. Res., 5 (3), 654-657 (1990):

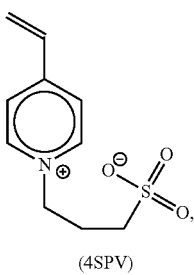

(4SPV)

the 1-vinyl-3-(3-sulphopropyl) imidazolium betaine:

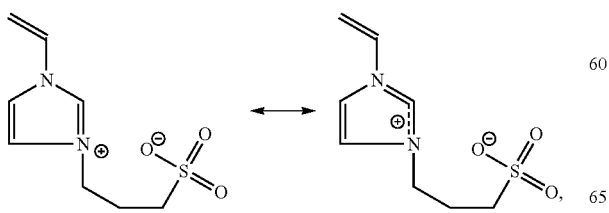

whose synthesis is described in the article "Aqueous solution properties of a poly(vinyl imidazolium sulphobetaine)", J. C. Salamone, W. Volkson, A. P. Oison, S. C. Israel, Polymer, 19, 1157-1162 (1978)

alkylsulphonates of dialkylammonium alkyl allyl, such as sulphopropyl methyl diallyl ammonium betaine:

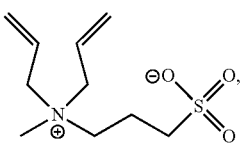

whose synthesis is described in the article "New poly (carbobetaine)s made from zwitterionic diallylammonium monomers", Favresse, Philippe; Laschewsky, Andre, Macromolecular Chemistry and Physics, 200 (4), 887-895 (1999), styrene alkylsulphonates of dialkylammonium alkyl, such as:

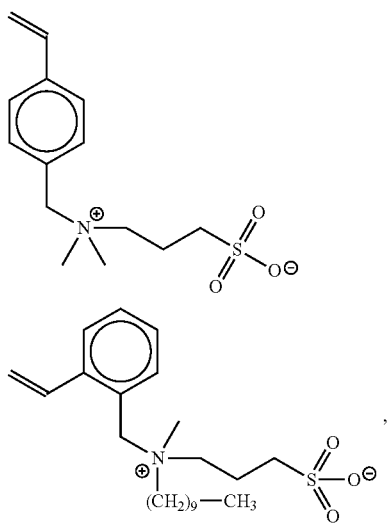

whose synthesis is described in the article "Hydrophobically Modified Zwitterionic Polymers: Synthesis, Bulk Properties, and Miscibility with Inorganic Salts", P. Koberle and A. Laschewsky, Macromolecules 27, 2165-2173 (1994), betaines from dienes and ethylenically unsaturated anhydrides, such as:

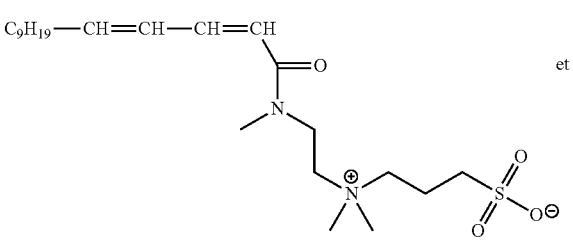

et

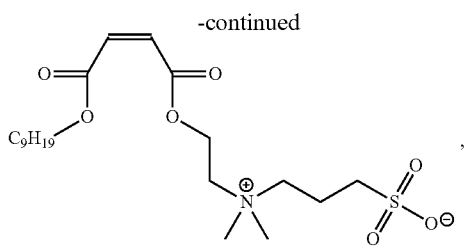

whose synthesis is described in the article "Hydrophobically Modified Zwitterionic Polymers: Synthesis, Bulk Properties, and Miscibility with Inorganic Salts", P. Koberle and A. Laschewsky, Macromolecules 27, 2165-2173 (1994), betaines from cyclic acetals, preferably ((dicyanoethanolate) ethoxy) dimethyl ammonium propyl methacrylamide.

The polybetaine polymer according to the present invention, can also be obtained in a known method by chemically modifying a polymer (copolymer) called precursor polymer, containing the $A_{precursor}$ units, which are modified (botanized) by a post-polymerisation reaction to achieve the units A being a betaine group. Sulphobetaine units can thus be obtained by chemically modifying precursor polymer units, preferably by chemically modifying a polymer containing pendant amine functions, with the help of a sulphuric electrophile compound, preferably a sultone (propanesultone, butanesultone), or a halogenoalkylsulphonate.

The compositions of the present invention may include zwitterionic polymers having a net positive charge.

Buffer

The composition that is sprayed into the air may include a buffer to prevent the zwitterionic from interacting other ingredients in the composition. Without wishing to be bound by theory, it believed that without a buffer, the zwitterionic polymer will solidify and separate from the aqueous phase.

The buffer may be present in an amount of from about 0.01% to about 5.0%, alternatively about 0.01% to about 2.0%, alternatively about 0.01% to about 2.0%, alternatively about 0.01% to about 0.2%, alternatively about 0.1.

A suitable buffer herein is a weak acid, an organic and/or and inorganic salt. In one embodiment, the organic salt is selected from monovalent, divalent, or trivalent salts, or mixtures thereof such as sodium citrate, sodium chloride, sodium phosphate, potassium chloride, potassium phosphate.

Surfactants

The compositions of the present invention may comprise a surfactant. The surfactant is preferably present at a level of greater than about 0.001% to about 10%, by weight of the composition, alternatively from about 0.5% to about 3, alternatively about 0.7% to about 3%, alternatively about 1% to about 3%, alternatively from about 1% to about 2%, alternatively greater than 1%. The exact level of surfactants in the compositions depends on a number of factors including surfactant type, class and chain-length, surfactant contribution to viscosity and desired level of polymer in the composition.

Suitable surfactants are those selected from the group consisting of nonionic surfactants, cationic surfactants, zwitterionic surfactants, amphoteric surfactants, and mixtures thereof. Examples of suitable surfactants are described in McCutcheon's Vol. 1: Emulsifiers and Detergents, North American Ed., McCutcheon Division, MC Publishing Co., 2002.

In one embodiment, the composition comprises non-ionic surfactants. Non-limiting examples of suitable nonionic surfactants include alcohol alkoxylates, alkyl polysaccharides, amine oxides, block copolymers of ethylene oxide and propylene oxide, castor oil derivitives, fluoro surfactants, and silicon based surfactants. Other non-ionic surfactants that can be used include those derived from natural sources such as sugars and include $C_8$-$C_{16}$ N-alkyl glucose amide surfactants.

Also suitable for use in the present invention are the fluorinated nonionic surfactants. One particularly suitable fluorinated nonionic surfactant is Fluorad F170 (3M Corporation, 3M Center, St. Paul, Minn., USA). Fluorad F170 has the formula $C_8F_{17}SO_2N(CH_2—CH_3)(CH_2CH_2O)_x$. Also suitable for use in the present invention are silicon-based surfactants. One example of these types of surfactants is Silwet L7604 available from Dow Chemical (1691 N. Swede Road, Midland, Mich., USA).

Solubilizer

In some embodiments, the compositions of the present invention may include a solubilizing surfactant to solubilize any excess hydrophobic organic materials, particularly any perfume materials, and also optional ingredients (e.g., insect repelling agent, antioxidant, etc.) which can be added to the composition, that are not readily soluble in the composition, to form a clear solution. A suitable solubilizing surfactant, is a no-foaming or low-foaming surfactant. In a preferred embodiment, the freshening composition contains hydrogenated castor oil. One suitable hydrogenated castor oil that may be used in the present composition is Basophor™, available from BASF.

Compositions containing anionic surfactants and/or detergent surfactants may generate chalky residue. In some embodiments, the composition is free of anionic surfactants and/or detergent surfactants.

Wetting Agent

In some embodiments, the compositions of the present invention may include a wetting agent that provides a low surface tension permitting the composition to spread readily and more uniformly. It has been found that the aqueous composition, without such a wetting agent may not spread satisfactorily. The spreading of the composition also allows it to dry faster when the composition contacts a surface.

Nonlimiting examples of wetting agents include block copolymers of ethylene oxide and propylene oxide. Suitable block polyoxyethylene-polyoxypropylene polymeric surfactants include those based on ethylene glycol, propylene glycol, glycerol, trimethylolpropane and ethylenediamine as the initial reactive hydrogen compound. Polymeric compounds made from a sequential ethoxylation and propoxylation of initial compounds with a single reactive hydrogen atom, such as $C_{12-18}$ aliphatic alcohols, are not generally compatible with the cyclodextrin. Certain of the block polymer surfactant compounds designated Pluronic® and Tetronic® by the BASF-Wyandotte Corp., Wyandotte, Mich., are readily available.

Nonlimiting examples of wetting agents of this type are described in U.S. Pat. No. 5,714,137 and include the Silwet® surfactants available from Momentive Performance Chemical, Albany, N.Y. Exemplary Silwet surfactants are as follows:

| Name | Average MW |
|---|---|
| L-7608 | 600 |
| L-7607 | 1,000 |
| L-77 | 600 |
| L-7605 | 6,000 |
| L-7604 | 4,000 |

-continued

| Name | Average MW |
|---|---|
| L-7600 | 4,000 |
| L-7657 | 5,000 |
| L-7602 | 3,000; |
| and mixtures thereof. | |

Perfume Ingredients

The compositions of the present invention may comprise perfume mixture having perfume ingredients. The perfume mixture may comprise about 0.01% to about 10%, alternatively about 0.01% to about 5%, alternatively about 0.01% to about 3%, alternatively about 2.5%, by weight of the composition of the present invention.

In some embodiments, the perfume ingredients have characteristics that provide the composition with a more consistent release profile. Perfume ingredients often have different volatilities, boiling points, and odor detection thresholds. When perfumes are discharged into the air, the ingredients with the higher volatilities (referred to as "top notes") will be the ingredients that will volatilize and be detected by a person's sense of smell more quickly than the ingredients with lower volatilities (referred to as "middle notes") and the ingredients with the lowest volatility (referred to as "bottom notes"). This will cause the character of the perfume to change over time since after the perfume is first emitted, the overall perfume character will contain fewer and fewer top notes and more bottom notes.

In general, a perfume ingredient's character and volatility may be described in terms of its boiling point ("BP") and its octanol/water partition coefficient (or "P"). The boiling point referred to herein is measured under normal standard pressure of 760 mmHg. The boiling points of many perfume ingredients, at standard 760 mm Hg are given in, e.g., "Perfume and Flavor Chemicals (Aroma Chemicals)," written and published by Steffen Arctander, 1969.

The octanol/water partition coefficient of a perfume ingredient is the ratio between its equilibrium concentrations in octanol and in water. The partition coefficients of the perfume ingredients used in the air freshening composition may be more conveniently given in the form of their logarithm to the base 10, log P. The log P values of many perfume ingredients have been reported; see for example, the Pomona92 database, available from Daylight Chemical Information Systems, Inc. (Daylight CIS), Irvine, Calif. However, the log P values are most conveniently calculated by the "CLOGP" program, also available from Daylight CIS. This program also lists experimental log P values when they are available in the Pomona92 database. The "calculated log P" (Clog P) is determined by the fragment approach of Hansch and Leo (cf., A. Leo, in Comprehensive Medicinal Chemistry, Vol. 4, C. Hansch, P. G. Sammens, J. B. Taylor and C. A. Ramsden, Eds., p. 295, Pergamon Press, 1990). The fragment approach is based on the chemical structure of each perfume ingredient, and takes into account the numbers and types of atoms, the atom connectivity, and chemical bonding. The Clog P values, which are the most reliable and widely used estimates for this physicochemical property, are alternatively used instead of the experimental log P values in the selection of perfume ingredients for the air freshening composition.

The perfume mixture may comprise perfume ingredients selected from one or more groups of ingredients. A first group of ingredients comprises perfume ingredients that have a boiling point of about 250° C. or less and Clog P of about 3 or less. Alternatively, the first perfume ingredients have a boiling point of 240° C. or less, alternatively 235° C. or less, alternatively the first perfume ingredients have a Clog P value of less than 3.0, alternatively 2.5 or less. One or more ingredients from the first group of perfume ingredients can be present in any suitable amount in the perfume mixture. In certain embodiments, the first perfume ingredient is present at a level of at least 1.0% by weight of the perfume mixture, alternatively at least 3.5%, alternatively at least 7.0%, by weight of the perfume mixture.

A second group of perfume ingredients comprise perfume ingredients that have a boiling point of 250° C. or less and Clog P of 3.0 or more, alternatively the second perfume ingredients have a boiling point of 240° C. or less, alternatively 235° C. or less, alternatively the second perfume ingredients have a Clog P value of greater than 3.0, alternatively greater than 3.2. One or more ingredients from the second group of perfume ingredients can be present in any suitable amount in the perfume mixture. In certain embodiments, the second perfume ingredient is present at a level of at least 1.0% by weight of the perfume mixture, alternatively at least 3.5%, alternatively at least 7.0%, by weight of the perfume mixture.

A third group of perfume ingredients comprises perfume ingredients that have a boiling point of 250° C. or more and Clog P of 3.0 or less, alternatively the third perfume ingredients have boiling point of 255° C. or more, alternatively 260° C. or more. Alternatively, this additional perfume ingredient has a Clog P value of less than 3.0, alternatively 2.5 or less. One or more ingredients from the third group of perfume ingredients can be present in any suitable amount in the perfume mixture. In certain embodiments, the third perfume ingredient is present at a level of at least 10% by weight of the perfume mixture, alternatively at least 25%, alternatively greater than 40%, alternatively greater than 50%, by weight of the perfume mixture.

A fourth group of perfume ingredients comprises perfume ingredients that have a boiling point of 250° C. or more and Clog P of 3.0 or more, alternatively this additional perfume ingredient has boiling point of 255° C. or more, alternatively 260° C. or more, alternatively, the additional perfume ingredient has a Clog P value of greater than 3.0, even more alternatively greater than 3.2. One or more ingredients from the fourth group of perfume ingredients can be present in any suitable amount in the perfume mixture. In certain embodiments, the fourth perfume ingredient is present at a level of at least 10% by weight of the perfume mixture, alternatively at least 25%, alternatively greater than 40%, alternatively greater than 50%, by weight of the perfume mixture.

Table 1 provides some non-limiting examples of the third and fourth group of perfume ingredients which have a B.P. of greater than or equal to about 250° C.

TABLE 1

Examples of Perfume Ingredients

| Perfume Ingredients | Approximate B.P. (° C.) | Approximate ClogP |
|---|---|---|
| Allyl Cyclohexane Propionate | 267 | 3.935 |
| Ambrettolide | 300 | 6.261 |
| Amyl Benzoate | 262 | 3.417 |
| Amyl Cinnamate | 310 | 3.771 |
| Amyl Cinnamic Aldehyde | 285 | 4.324 |
| Amyl Cinnamic Aldehyde Dimethyl Acetal | 300 | 4.033 |

TABLE 1-continued

Examples of Perfume Ingredients

| Perfume Ingredients | Approximate B.P. (° C.) | Approximate ClogP |
|---|---|---|
| iso-Amyl Salicylate | 277 | 4.601 |
| Aurantiol | 450 | 4.216 |
| Benzophenone | 306 | 3.120 |
| Benzyl Salicylate | 300 | 4.383 |
| Cadinene | 275 | 7.346 |
| Cedrol | 291 | 4.530 |
| Cedryl Acetate | 303 | 5.436 |
| Cinnamyl Cinnamate | 370 | 5.480 |
| Coumarin | 291 | 1.412 |
| Cyclohexyl Salicylate | 304 | 5.265 |
| Cyclamen Aldehyde | 270 | 3.680 |
| Dihydro Isojasmonate | 300 | 3.009 |
| Diphenyl Methane | 262 | 4.059 |
| Ethylene Brassylate | 332 | 4.554 |
| Ethyl Methyl Phenyl Glycidate | 260 | 3.165 |
| Ethyl Undecylenate | 264 | 4.888 |
| iso-Eugenol | 266 | 2.547 |
| Exaltolide | 280 | 5.346 |
| Galaxolide | 260 | 5.482 |
| Geranyl Anthranilate | 312 | 4.216 |
| Hexadecanolide | 294 | 6.805 |
| Hexenyl Salicylate | 271 | 4.716 |
| Hexyl Cinnamic Aldehyde | 305 | 5.473 |
| Hexyl Salicylate | 290 | 5.260 |
| Linalyl Benzoate | 263 | 5.233 |
| 2-Methoxy Naphthalene | 275 | 3.235 |
| Methyl Cinnamate | 263 | 2.620 |
| Methyl Dihydrojasmonate | 300 | 2.275 |
| beta-Methyl Naphthyl ketone | 300 | 2.275 |
| Musk Indanone | 250 | 5.458 |
| Musk Ketone | M.P.[1] = 137 | 3.014 |
| Musk Tibetine | M.P. = 136 | 3.831 |
| Myristicin | 276 | 3.200 |
| delta-Nonalactone | 280 | 2.760 |
| Oxahexadecanolide-10 | 300 | 4.336 |
| Oxahexadecanolide-11 | M.P. = 35 | 4.336 |
| Patchouli Alcohol | 285 | 4.530 |
| Phantolide | 288 | 5.977 |
| Phenyl Ethyl Benzoate | 300 | 4.058 |
| Phenylethylphenylacetate | 325 | 3.767 |
| alpha-Santalol | 301 | 3.800 |
| Thibetolide | 280 | 6.246 |
| delta-Undecalactone | 290 | 3.830 |
| gamma-Undecalactone | 297 | 4.140 |
| Vanillin | 285 | 1.580 |
| Vetiveryl Acetate | 285 | 4.882 |
| Yara-Yara | 274 | 3.235 |

[1]"M.P." is melting point (in degrees C.); these ingredients have a B.P. higher than 275° C.

The perfume mixture may also comprise any suitable combination of perfume groups described above. For example, in another embodiment, the perfume mixture comprises at least 50% of perfume ingredients from groups 3 and 4, and the balance of the perfume mixture is from the first and/or second group of perfume ingredients.

The perfume mixtures useful in the air freshening composition can utilize relatively high levels of particularly chosen perfume ingredients. Such high levels of perfume had not previously been used because of a phenomenon known as the odor detection threshold ("ODT"). Perfume ingredients generate an olfactory response in the individual smelling the perfume. The ODT is the minimum concentration of perfume ingredient which is consistently perceived to generate an olfactory response in an individual. As the concentration of perfume is increased, so is the odor intensity of the perfume, and the olfactory response of the individual. This is so until the concentration of the perfume reaches a maximum, at which point the odor intensity reaches a plateau beyond which there is no additional olfactory response by the individual. This range of perfume concentration through which the individual consistently perceives an odor is known as the Odor Detection Range ("ODR").

The concentration of perfume ingredients in the perfume mixture should be formulated within the ODR of the perfume ingredient, since compositions comprising higher levels provide no additional olfactory response and are thus costly and inefficient.

In some circumstances, however, it may be desirable to exceed the ODR of at least some of the perfume ingredients. The perfume is not only effusive and very noticeable when the product is used in an aqueous aerosol or pump spray, but the perfume continues diffusing from the multiple droplets disseminated on all surfaces within the room. The reservoir of perfume serves to replace diffused perfume, thus maintaining perfume concentration in the room at or beyond the ODT of the perfume throughout use, and alternatively, after it has been initially sprayed or otherwise dispersed. Moreover, it has also been found that the perfume tends to linger for longer in the room in which the composition is used. Thus, in one embodiment, at least one perfume ingredient selected from the first and/or second perfume ingredients is alternatively present at a level of 50% in excess of the ODR, more alternatively 150% in excess of the ODR. For very lingering perfume, at least one perfume ingredient can be added at a level of more than 300% of the ODR.

In certain embodiments, the perfume mixture described herein can maintain a more consistent character over time. Larger droplet sizes (which have a smaller total surface area compared to a plurality of small droplets) can be used to reduce the speed with which the highly volatile top notes will volatilize. The droplets can not only release the perfume mixture when they are suspended in the air, they can also fall until they contact a surface (e.g., tables or countertops, furniture, and floors, carpets, etc.). The droplets that fall onto these surfaces can serve as "reservoirs" for the perfume mixture, and also release the perfume mixture after landing on such surfaces. In this manner, there can be a continual renewal of the scent originally percieved by the consumer, which is replenished by molecules released from the droplets over a period of time. The mixing action of the heavier ODT molecules (e.g., bottom notes such as musks, woody notes, etc.) with the newly released fresher more volatile lower ODT materials, will provide the consumer with a scent that is reminiscent of the one they initially experienced when the product was first applied.

Odor detection thresholds are determined using a commercial gas chromatograph ("GC") equipped with flame ionization and a sniff-port. The gas chromatograph is calibrated to determine the exact volume of material injected by the syringe, the precise split ratio, and the hydrocarbon response using a hydrocarbon standard of known concentration and chain-length distribution. The air flow rate is accurately measured and, assuming the duration of a human inhalation to last 12 seconds, the sampled volume is calculated. Since the precise concentration at the detector at any point in time is known, the mass per volume inhaled is known and concentration of the material can be calculated. To determine whether a material has a threshold below 50 parts per billion (ppb), solutions are delivered to the sniff port at the back-calculated concentration. A panelist sniffs the GC effluent and identifies the retention time when odor is noticed. The average across all panelists determines the threshold of noticeability.

The necessary amount of analyte is injected onto the column to achieve a 50 ppb concentration at the detector.

Typical gas chromatograph parameters for determining odor detection thresholds are listed below. The test is conducted according to the guidelines associated with the equipment.
Equipment:
- GC: 5890 Series with FID detector (Agilent Technologies, Ind., Palo Alto, Calif., USA)
- 7673 Autosampler (Agilent Technologies, Ind., Palo Alto, Calif., USA)
- Column: DB-1 (Agilent Technologies, Ind., Palo Alto, Calif., USA)
- Length 30 meters ID 0.25 mm film thickness 1 micron (a polymer layer on the inner wall of the capillary tubing, which provide selective partitioning for separations to occur)

Method Parameters:
- Split Injection: 17/1 split ratio
- Autosampler: 1.13 microliters per injection
- Column Flow: 1.10 mL/minute
- Air Flow: 345 mL/minute
- Inlet Temp. 245° C.
- Detector Temp. 285° C.
- Temperature Information
- Initial Temperature: 50° C.
- Rate: 5 C/minute
- Final Temperature: 280° C.
- Final Time: 6 minutes
- Leading assumptions: (i) 12 seconds per sniff
  (ii) GC air adds to sample dilution In the perfume art, some auxiliary materials having no odor, or a low odor, are used, e.g., as solvents, diluents, extenders or fixatives. Non-limiting examples of these materials are ethyl alcohol, carbitol, diethylene glycol, dipropylene glycol, diethyl phthalate, triethyl citrate, isopropyl myristate, and benzyl benzoate. These materials are used for, e.g., solubilizing or diluting some solid or viscous perfume ingredients to, e.g., improve handling and/or formulating. These materials are useful in the perfume mixtures, but are not counted in the calculation of the limits for the definition/formulation of the perfume mixtures used herein.

It can be desirable to use perfume ingredients and even other ingredients, alternatively in small amounts, in the perfume mixtures described herein, that have low ODT values. The ODT of an odorous material is the lowest vapor concentration of that material which can be detected. The ODT and some ODT values are discussed in, e.g., "Standardized Human Olfactory Thresholds", M. Devos et al, IRL Press at Oxford University Press, 1990, and "Compilation of Odor and Taste Threshold Values Data", F. A. Fazzalari, editor, ASTM Data Series DS 48A, American Society for Testing and Materials, 1978. The use of small amounts of perfume ingredients that have low ODT values can improve perfume character such as by adding complexity to the perfume character to "round off" the fragrance. Examples of perfume ingredients that have low ODT values useful in the perfume mixture include, but are not limited to: coumarin, vanillin, ethyl vanillin, methyl dihydro isojasmonate, 3-hexenyl salicylate, isoeugenol, lyral, gamma-undecalactone, gamma-dodecalactone, methyl beta naphthyl ketone, and mixtures thereof. These materials can be present at any suitable level. In some embodiments, these materials may be present at low levels in the perfume mixture, typically less than 5%, alternatively less than 3%, alternatively less than 2%, by weight of the perfume mixture.

Malodor Counteractant

The composition may also comprise a malodor counteractant to deliver a genuine malodor removal benefit. A genuine malodor removal benefit is defined as both a sensory and analytically measurable (such as by gas chromatograph) malodor reduction. Thus, if the composition delivers a genuine malodor removal benefit, the composition may neutralize or block malkodors as opposed to merely masking malodors.

One type of composition utilizes a malodor neutralization via vapor phase technology. The vapor phase technology is defined as malodor counteractants that mitigate malodors in the air via chemical reactions or neutralization. More alternatively, the malodor counteractants are safe for fabrics.

In an embodiment of a composition that utilizes vapor phase technology, the composition comprises one or more fabric-safe aliphatic aldehydes and/or one or more enones (ketones with unsaturated double bonds). It may also be desirable for these vapor phase technologies to have virtually no negative impact on the desired perfume character. Certain malodor technologies are odoriforess and negatively impact the overall character of the fragrance. In this case, a perfume/malodor counteractant premix is formed such that the perfume raw materials used in this technology are selected to neutralize any odor of the malodor counteractants. This odor neutralized premix can then be added to a parent perfume without affecting the character of the parent fragrance. This permits the vapor phase technology to be used broadly with a large variety of fragrance types. In addition, types of vapor phase technologies that predominately comprise a straight chain aliphatic backbone will not discolor fabrics, unlike products that utilize types of aldehydes that contain multiple double bonds and benzene rings.

The malodor counteractants that utilize vapor phase technology can be present in any suitable amount in a perfume mixture. In certain embodiments, the malodor counteractants may be present in an amount greater than or equal to about 1% and less than about 50% by weight of the perfume mixture of the composition. In other embodiments, the malodor counteractants may be present in an amount greater than or equal to about 3% and less than about 30% by weight of the perfume mixture of the composition. In other embodiments, the malodor counteractants may be present in an amount greater than or equal to about 8% and less than about 15% by weight of the perfume mixture.

The following table illustrates the importance of proper selection of aldehydes and enones to avoid fabric yellowing.

| Aldehyde Solution Tested | Fadometer Test on treated Fabric (0.75 grams of product are pipetted onto a 4 inch × 4 inch (10 cm × 10 cm) swatch which is then subjected to 5 hours of exposure to simulated sunlight using a SUNTEST CPS+ model Fadometer supplied by Atlas, Chicago, Illinois, USA. |
|---|---|
| Control - untreated fabric swatch | No yellowing |
| 1000 ppm amylic cinnamic aldehyde (aromatic) | Yellowish brown |
| 1000 ppm citronellal (aromatic) | Yellowish brown |
| 1000 ppm citral aldehyde (aliphatic) | No yellowing |
| 1000 ppm lauric aldehyde (aliphatic) | No yellowing |

Examples of suitable aliphatic aldehydes are R—COH where R is saturated $C_7$ to $C_{22}$ linear and/or branched with no more than two double bonds. Additional examples of aliphatic aldehydes are lyral, methyl dihydro jasmonate, ligustral, melonal, octyl aldehyde, citral, cymal, nonyl aldehyde, bourgeonal, P. T. Bucinal, Decyl aldehydes, lauric aldehyde, and mixtures thereof. Examples of suitable enones are ionone alpha, ionone beta, ionone gamma methyl, and mixtures thereof. The malodor counteractant can comprise one or more aliphatic aldehydes, one or more enones, or any combination thereof. The following are several non-limiting examples of perfume formulations that include fabric-safe vapor phase malodor counteractants.

In a number of the examples above, the composition comprises a mixture of ionones and reactive aldehydes. Aldehydes react with amine odors (such as fish and cigarette odors).

Another type of malodor counteractant comprises cyclodextrins and/or ionones to neutralize the malodor when the composition is a mist suspended in the air. Ionones react with amines. Cyclodextrin forms complexes with different organic molecules to make them less volatile. In some embodiments, the compositions of the present invention may include solubilized, water-soluble, uncomplexed cyclodextrin. Cyclodextrin molecules are described in U.S. Pat. No. 5,714,137, and U.S. Pat. No. 5,942,217. Suitable levels of cyclodextrin are from about 0.01% to about 3%, alternatively from about 0.01% to about 2%, alternatively from about 0.05% to about 1%, alternatively from about 0.05% to about 0.5%, by weight of the composition.

Other types of compositions function by sensory modification of those exposed to odors. There are at least two ways of modifying the sensory perception of odors. One way (habituation) is to mask odors using perfume so that a person exposed to the odor smells the perfume more than the odor. The other way (anosmia) is to reduce the person's sensitivity to malodors. Ionones are compositions that are capable of reducing the sensitivity of a person's olfactory system to the presence of certain undesirable odors, such as sulfur odors caused by eggs, onions, garlic, and the like.

The composition can employ one or more of the types of malodor control mechanisms and ingredients described above (e.g., hydrophilic odor traps, vapor phase technology, and odor blockers (sensory modifiers).

Other Optional Ingredients

Other optional ingredients include solvents, alcohols (e.g., ethanol), preservatives, antimicrobial compounds, and other quality control ingredients. In certain embodiments, the perfume ingredients and the malodor counteractants comprise from about 0.01% to about 5%, by weight of the composition, or any other range within this range. In embodiments in which the perfume and any malodor counteractant ingredients are diluted, one non-limiting example of such a narrower range is between about 0.05% and about 2% of the composition. In other embodiments, one or more fabric-safe aldehydes and/or or more fabric-safe ionones comprise less than or equal to about 25% of the weight of said composition.

Propellant

The composition may comprise a propellant for assisting with spraying the composition into the air. The composition may comprise propellants that are primarily non-hydrocarbon propellants (that is, propellants that are comprised of more non-hydrocarbon propellants by volume than hydrocarbon propellants, that is, greater than or equal to about 50% of the volume of the propellant). In some embodiments, the propellant may be substantially free of hydrocarbons such as: isobutene, butane, isopropane, and dimethyl ether. In other embodiments, the propellant may be a hydrocarbon. In embodiments in which the composition uses a non-hydrocarbon propellant, such a propellant may include a compressed gas. Some compressed gases can be more environmentally-friendly than hydrocarbon propellants, which may make them more suitable for dust reducing compositions that also freshen the air. Suitable compressed gases include, but are not limited to compressed air, nitrogen, nitrous oxide, inert gases, carbon dioxide, etc., and mixtures thereof.

Spray Dispenser

The composition can be packaged in any suitable spray dispenser known in the art. One suitable dispenser is a plastic aerosol sprayer. The dispenser may be constructed of polyethylene such as a high density polyethylene; polypropylene; polyethyleneterephthalate ("PET"); vinyl acetate, rubber elastomer, and combinations thereof. In one embodiment, the spray dispenser is made of clear PET.

The spray dispenser may hold about 1 to about 300 grams of composition, alternatively about 275 grams, alternatively about 250 gram, alternatively about 150 grams of composition.

The spray dispenser may be capable of withstanding internal pressure in the range of about 50 p.s.i.g. to about 140 psig, alternatively about 80 to about 130 p.s.i.g.

Although compressed gas systems produce relatively larger particles than hydrocarbon systems and may provide superior particulate reduction and more desirable perfume release profile, these same particles can create wetness on the floor and other surfaces because they are heavier and fall to the ground. In one embodiment of the present invention, the total composition output and the spray droplet/particle size distribution are selected to support the particulate removal efficacy but avoid a surface wetness problem. Total output is determined by the flow rate of the composition it is released from the spray dispenser. To achieve a spray profile that produces minimal surface wetness, it is desirable to have a low flow rate and small spray droplets. The flow rate may be less than 1.2 grams/second and the droplets will be small enough that when, dispensed at a height of 5 feet from the ground, less than 40% of the droplets fall to the ground.

A low flow rate can be achieved via the valve, the delivery tube and/or the nozzle but nozzle modifications have proven to be less susceptible to instances of clogging. Flow rate is determined by measuring the rate of composition expelled by a full container for the first 60 seconds of use. In one embodiment, the flow rate of the composition being released from the spray dispenser is from about 0.0001 grams/second to about 2.0 grams/second. Alternatively, the flow rate is from about 0.001 grams/second to about 1.5 grams/second, alternatively about 0.01 grams/second to about 1.5 grams/second, alternatively about 0.01 grams/second to about 1.3 grams/second, alternatively about 0.5 grams/second to about 1.3 grams/second, alternatively about 0.7 grams/second to about 1.3 grams/second. In an alternate embodiment, the flow rate is from about 0.8 grams/second to about 1.3 grams/second.

Small particles can be efficiently created when the spray is dispensed in a wide cone angle. For a given nozzle component and delivery tube, cone angles can be modified by varying the insertion depth of the nozzle in the delivery tube. In one embodiment, the cone angle will be greater than about 20 degrees, alternatively greater than about 30 degrees, alternatively greater than about 35 degrees, alternatively greater than about 40 degrees, alternatively greater than about 50 degrees. The mean particle size of the spray droplets may be in the range of from about 10 µm to about 100 µm, alternatively from about 20 µm to about 60 µm. In one version of such an embodiment, at least some of the spray droplets are sufficiently small in size to be suspended in the air for at least about 10 minutes, and in some cases, for at least about 15 minutes, or at least about 30 minutes.

In one embodiment, the aerosol dispenser may be configured to spray the composition at an angle that is between an angle that is parallel to the base of the container and an angle that is perpendicular thereto. In other embodiments, the desired size of spray droplets can be delivered by other types of devices that are capable of being set to provide a narrow range of droplet size. Such other devices include, but are not limited to: foggers, ultrasonic nebulizers, electrostatic sprayers, and spinning disk sprayers.

To reduce particulates in air, in one embodiment, the time in which the composition contacts a particulate is less than about 30 seconds.

The composition can be made in any suitable manner. All of the ingredients can simply be mixed together. In certain embodiments, the acidic ingredients are combined with the solvent prior adding the zwitterionic polymer. In another embodiment, it may be desirable to use the mixture of ingredients as a concentrated product (and to dispense such a concentrated product, such as by spraying). In other embodiments, the mixture of ingredients can be diluted by adding the same to some suitable carrier and that composition can dispensed in a similar manner.

Methods of Reducing Particulates in the Air

The methods of the present invention can comprise providing a composition, having an effective amount of a zwitterionic polymer and any other ingredients described herein, in a spray dispenser or any other device described herein; and spraying such composition into the air. The composition can be dispersed in the form of spray droplets, and in some cases, it may be desirable for the droplets to have the droplets sizes of the particular size specified herein. The method can be carried out in such a way to achieve any of the results that are specified herein. For example, in one non-limiting embodiment, the method can be carried out in a manner such that greater than 50%, alternatively greater than 75% of dust particles are reduced after 60 minutes.

EXAMPLES

The following are non-limiting examples of particulate reducing compositions according to the present invention and method for measuring particulate reduction of compositions according to the present invention.

Exemplary Formulas

| Ingredients | I Wt. % | II Wt. % | III Wt. % | IV Wt. % | V Wt. % | VI Wt. % |
|---|---|---|---|---|---|---|
| Hydroxypropyl beta-cyclo-dextrin | 0.2 | — | — | — | 0.3 | 0.1 |
| Zwitterionic Polymer | 0.1 | 0.1 | 0.1 | — | 0.1 | 0.05 |
| Diethylene glycol | 0.25 | — | — | — | — | — |
| Silwet L-7600 | 0.1 | 0.2 | — | 0.2 | 0.1 | 0.1 |
| Sodium Dioctyl Sulfosuccinate | 0.2 | — | 0.2 | 0.1 | 0.2 | 0.2 |
| Acid Salt | 0.1 | 0.1 | — | 0.2 | 0.1 | — |
| Ethanol | 3 | 5 | 5 | 3 | 5 | 5 |
| Hydrogenated castor oil | 0.4 | 0.8 | 1.2 | 1.6 | 1.8 | 5 |
| Perfume Mixture | 0.6 | 0.8 | 0.4 | 0.2 | 1 | 0.1 |
| Organic Acid | 0.05 | 0.1 | — | 0.1 | 0.05 | — |
| Preservative | 0.015 | 0.015 | 0.015 | 0.015 | 0.015 | 0.015 |
| HCl or NaOH | to pH 5 | to pH 5 | to pH 5 | to pH 5 | to pH 7 | to pH 8 |
| Distilled water | Balance | Balance | Balance | Balance | Balance | Balance |

Dust Particle Reduction Test

To determine the profile of floating dust particles when treated with compositions according to the present invention, one may utilize the following test design which consists of:
an enclosed environmental chamber 12.2 cubic feet in volume (39.25"W×25."D×21.5"H) equipped with a 4 inch 110 cfm fan;
two additional fans are introduced for increased airflow that are 11.9 cm×11.9 cm×3.8 cm and 90 cfm;
a sample probe placed inside the chamber connected by tubing with reduced electrostatics and particle adhesion;
a Solair™ 3100 laser particle counter is used;
dust particles of known composition and particle size distribution;

All available channels should be selected on the particle counter for testing. Timing controls should be adjusted as necessary within the limits, of the particle counter. Introduce a known amount of dust particles into the environmental chamber over time, as needed, for depletion of testing amount required. Continue sampling until desired equilibrium is reached. If treatment with aerosol is required, spray product into chamber and continue sampling until relevant time achieved.

Using the above test design, compositions (i.e. Samples 1 and 2 as outlined below) according to the present invention were sampled for efficacy in reducing dust particles in the air.

| Ingredients | Sample I Wt. % | Sample 2 Wt. % |
|---|---|---|
| Hydroxypropyl beta-cyclodextrin | 0.15 | 0.15 |
| Zwitterionic Polymer | 0.05 | 1 |
| Wetting Agent | 0.2 | 0.2 |
| Acid Salt | 0.1 | 0.1 |
| Alcohol | 5 | 5 |
| Castor oil | 1.4 | 1.4 |
| Perfume Mixture | 0.34 | 0.34 |
| Preservative | 0.02 | 0.02 |
| Acid | to pH 5 | to pH 5 |
| Distilled water | Balance | Balance |

The results are reported in Table 3 and plotted in FIG. 1. One can see that compositions according to the present invention reduce dust effectively versus the control. One can further see that the sample having 0.05 wt. % zwitterionic polymer is more effective in reducing dust particles than the sample having higher levels of zwitterionic polymer. Without wishing to be bound by theory, it is believed that higher zwitterionic polymer levels result in higher viscosity in an aqueous composition. This, in turn, interferes with the spray properties achievable within a compressed gas system. The resulting properties significantly affects the efficacy of the liquid-vapor contact which reduces a composition's efficacy in agglomerating dust particles in the air.

TABLE 3

| | Wt. % Zwitterionic polymer | Avg. particle size distribution | Initial dust particle count | Dust particle count after 60 mins |
|---|---|---|---|---|
| Dust in air only (Control) | 0 | 0.5 micron | 38,250 | 17,300 |
| Dust in air treated with sample 1 | 0.05% | 20-60 micron | 40,548 | 3,293 |

TABLE 3-continued

|  | Wt. % Zwitterionic polymer | Avg. particle size distribution | Initial dust particle count | Dust particle count after 60 mins |
|---|---|---|---|---|
| Dust in air treated with sample 2 | 1% | >90 micron | 40,033 | 8,582 |

Dust Absorption & Agglomeration Test

A test was performed to compare the penetration time and agglomeration efficacy of various compositions. A known amount of solution is added into plastic transparent cup; all samples to be compared must use equal amount of solution. A known amount and composition of loose particulates is dispersed on the surface of the solution. Penetration time is reported as amount of time particulates break through the surface of liquid. Absorption time is reported as amount of time all particulates migrate from the surface of the liquid to solution—i.e. time at which there is no more particulates on the exterior surface of liquid. Percent agglomerated is measured by visual assessment of loose particulates that combine to form masses of bigger particulates, compared to a visual standard on a 0-100 scale.

Table 4 demonstrates that compositions having a zwitterionic polymer performed better in penetration time and agglomeration of particulates in the air than other compositions for reducing particulates.

TABLE 4

|  | Ingredient | Penetration time | Total Absorption Time | % Agglomerated |
|---|---|---|---|---|
| Sample 1 | Zwitterionic Polybetaine | Instantaneous | 25 Seconds | 95% |
| Sample 3 | Water | 5 mins | >30 mins | 0% |
| Sample 4 | Quat | ~2 seconds | 40 Seconds | 60% |
| Sample 5 | Polyacrylic | Instantaneous | 32 Seconds | 10% |
| Sample 6 | Commercially available air freshener | 2 mins | >30 mins | 0% |

The disclosure of all patents, patent applications (and any patents which issue thereon, as well as any corresponding published foreign patent applications), and publications mentioned throughout this description are hereby incorporated by reference herein. It is expressly not admitted, however, that any of the documents incorporated by reference herein teach or disclose the present invention.

Throughout this specification, components referred to in the singular are to be understood as referring to both a single or plural of such component.

All percentages stated herein are by weight unless otherwise specified.

It should be understood that every maximum numerical limitation given throughout this specification will include every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm"

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the subject invention have been described, it will be obvious to those skilled in the art that various changes and modifications of the subject invention can be made without departing from the spirit and scope of the invention. In addition, while the present invention has been described in connection with certain specific embodiments thereof, it is to be understood that this is by way of illustration and not by way of limitation and the scope of the invention is defined by the appended claims which should be construed as broadly as the prior art will permit.

What is claimed is:

1. A method for reducing particulates in the air comprising the steps of:
providing a composition, wherein said composition comprises:
I) about 0.001% to about 0.2%, by weight of said composition, of a zwitterionic polymer, said zwitterionic-polymer is:

$$H_3C-\underset{\underset{CH_3}{|}}{\overset{\overset{CH_3}{|}}{N^+}}-CH_2-\underset{\underset{}{|}}{\overset{\overset{OH}{|}}{CH}}-CH_2-\underset{\underset{CH_3}{|}}{\overset{\overset{CH_3}{|}}{N^+}}\!\!-\!\!\!\left(CH_2\right)_{\!\!\overline{3}}\!-\!NH$$
$$\hspace{2.5cm} I^- \hspace{2.8cm} I^- \hspace{1.2cm} C\!=\!O$$
$$-\!\!\left(CH_2-\underset{\underset{O\!\diagup^{C}\!\diagdown NH_2}{|}}{CH}\right)_{\!\!\overline{x}}\!\!\left(CH_2-\underset{\underset{O\!\diagup^{C}\!\diagdown ONa}{|}}{CH}\right)_{\!\!\overline{y}}\!\!\left(CH_2-\underset{\underset{CH_3}{|}}{\overset{}{C}}\right)_{\!\!\overline{z}}$$

with x having a mean value of 0 to 50 mol %, y having a mean value of 10 to 95 mol %, z having a mean value of 3 to 80 mol %, with x+y+z=100%, wherein x represents the mol % of units derived from the acrylamide monomer, y represents the mol % of units derived from the acrylic acid (sodium salt) monomer, and z represents the mol % of units derived from the Diquat monomer, wherein I, which are identical or different, represent counterions;
II) a propellant comprising a compressed gas; and
III) an aqueous carrier, wherein said composition comprises a viscosity of about 1.0 to about 2.5 cps; and
spraying said composition into the air such that said polymer agglomerates particulates in the air when said composition contacts particulates in the air.

2. The method of claim 1 wherein said zwitterionic polymer is present in an amount of from about 0.01% to about 0.05%, by weight of said composition.

3. The method of claim 1 wherein said composition further comprises a buffer.

4. The method of claim 1 wherein said composition further comprises a surfactant selected from the group consisting of: nonionic surfactants, zwitterionic surfactants, amphoteric surfactants, and mixtures thereof.

5. The method of claim 1 wherein said composition further comprises a perfume ingredient.

6. The method of claim 1, wherein said composition is provided in a plastic container.

7. The method of claim 1 wherein said composition comprises a pH of about 3 to about 7.

8. The method of claim 1 further comprising a malodor counteractant.

9. The method of claim 8 wherein said malodor counteractant comprises at least one of the following: cyclodextrin, carboxylic acids including mono, di, tri, and polyacrylic acids, and mixtures thereof.

10. The method of claim 1 wherein said compressed gas is selected from the group consisting of compressed air, nitrogen, nitrous oxide, inert gases, and carbon dioxide.

11. A method for reducing particulates in the air comprising the steps of:
   providing a composition, wherein said composition comprises:
   I) about 0.001% to about 0.2%, by weight of said composition, of a zwitterionic polymer, said zwitterionic-polymer is:

$$H_3C-\underset{\underset{CH_3}{|}}{\overset{\overset{CH_3}{|}}{N^+}}-CH_2-\underset{}{\overset{\overset{OH}{|}}{CH}}-CH_2-\underset{\underset{CH_3}{|}}{\overset{\overset{CH_3}{|}}{N^+}}\!\!-\!\!(CH_2)_{\overline{3}}\!-\!NH$$
$$I^- \quad I^- \quad C\!=\!O$$
$$-(CH_2-\underset{\underset{NH_2}{\overset{C}{\underset{\|}{O}}}}{CH})_{\overline{x}}(CH_2-\underset{\underset{ONa}{\overset{C}{\underset{\|}{O}}}}{CH})_{\overline{y}}(CH_2-\underset{\underset{CH_3}{|}}{C})_{\overline{z}}$$

with x having a mean value of 0 to 50 mol %, y having a mean value of 10 to 95 mol %, z having a mean value of 3 to 80 mol %, with x+y+z=100%, wherein x represents the mol % of units derived from the acrylamide monomer, y represents the mol % of units derived from the acrylic acid (sodium salt) monomer, and z represents the mol % of units derived from the Diquat monomer, wherein I, which are identical or different, represent counterions;

II) a propellant comprising a compressed gas; and

III) an aqueous carrier, wherein said composition comprises a viscosity of about 1.0 to about 2.5 cps; and;

spraying said composition in the air such that said polymer agglomerates particulates in the air when said composition contacts particulates in the air, wherein the sprayed composition comprises spray droplets having a mean particle size of from about 10 μm to about 100 μm.

\* \* \* \* \*